United States Patent [19]
Cassidy et al.

[11] Patent Number: 5,807,483
[45] Date of Patent: Sep. 15, 1998

[54] SNAP LATCH FILTER RING FOR A FUEL INJECTOR

[75] Inventors: Daniel G. Cassidy, Findlay; Michael E. Yost, Tiffin; Robert A. Avers, Bowling Green, all of Ohio

[73] Assignee: Kuss Corporation, Findlay, Ohio

[21] Appl. No.: 573,232

[22] Filed: Dec. 15, 1995

[51] Int. Cl.⁶ .................................................. B01D 35/02
[52] U.S. Cl. .......................... 210/232; 210/485; 210/495; 210/499; 55/422; 55/498; 55/DIG. 5
[58] Field of Search .................................... 210/232, 485, 210/495, 497.01, 416.4, 430, 459, 499; 55/498, 422, DIG. 5; 239/575, DIG. 23; 16/225, DIG. 43; 428/58

[56] References Cited

U.S. PATENT DOCUMENTS

| | | | |
|---|---|---|---|
| 3,633,757 | 1/1972 | Madern | 210/457 |
| 4,014,796 | 3/1977 | Sugiyama et al. | 210/497.01 |
| 4,207,189 | 6/1980 | Geuenich | 210/227 |
| 4,690,757 | 9/1987 | Mathus et al. | 210/232 |
| 4,836,923 | 6/1989 | Popoff et al. | 210/232 |
| 5,169,524 | 12/1992 | Meiritz et al. | 210/232 |
| 5,200,067 | 4/1993 | Sann | 210/232 |
| 5,209,845 | 5/1993 | Sims | 210/232 |
| 5,308,485 | 5/1994 | Griffin et al. | 210/232 |

*Primary Examiner*—Matthew O. Savage
*Attorney, Agent, or Firm*—Sixbey, Friedman, Leedom & Ferguson; Charles M. Leedom, Jr.; Thomas W. Cole

[57] ABSTRACT

A filter ring is provided that is particularly adapted for use around the circumferential fuel and timing fluid inlets of a diesel engine fuel injector. The filter ring includes first and second semi-annular, band-shaped filter portions, an integrally formed hinge means for pivotally interconnecting the filter portions, and a snap latch mechanism for detachably connecting the opposite ends of the filter portions. The snap latch mechanism is formed from a bead that extends substantially along the entire length of one of the filter portion ends, and a complementarily-shaped groove on the end of the other filter portion. The thickness of the bead and groove is less than the thickness of the opposite ends of the band-shaped filter portions so that the inner diameter of the resulting filter ring seats securely around a complementarily-shaped annular recess in the fuel injector. The snap latch mechanism allows the filter ring to be removed without damage, whereupon it may be cleaned and reused many times before requiring replacement.

14 Claims, 3 Drawing Sheets

SNAP LATCH FILTER RING FOR A FUEL INJECTOR

BACKGROUND OF THE INVENTION

This invention generally relates to filter rings, and is particularly concerned with a band-type filter that is detachably connectable around the inlet ports of a fuel injector by means of a snap latch.

Filter rings for filtering fluid flowing through openings in a fluid conducting body are known in the prior art. Such filters may be used, for example, to filter diesel fuel that enters the inlet port present in the cylindrical body of a diesel fuel injector. Such filters typically comprise an annular, band-shaped frame of flexible plastic material having a plurality of uniformly spaced rectangular apertures into which filter screens are secured. The fuel inlet port of the fuel injector is located within a shallow, annular recess that circumscribes the body of the fuel injector. The width of the annular recess is slightly larger than the width of the plastic filter frame so that the frame may be closely seated within the recess.

In the prior art, such a filter ring was split on one side along its axis of rotation so that the filter could be easily slid over a fuel injector, and seated in the complementarily-shaped recess containing the fuel inlet ports. The diameter of the split, uninstalled filter was manufactured somewhat larger than the diameter of the fuel injector so that the free ends of the annular frame of the filter would overlap after the filter was seated in the annular recess. The overlapping free ends were then ultrasonically welded together to complete the installation.

While such prior art filter rings have proven themselves to be effective in filtering diesel fuel flowing into fuel injectors, the applicants have noted several shortcomings in the design of such filters. For example, the installation of such filter rings is undesirably lengthy and cumbersome due to the necessity of having to ultrasonically weld the overlapping, free ends together after the filter is firmly seated in the annular recess provided in the fuel injector body. Moreover, such prior art filters cannot be reused when their filter screens become clogged with debris, as which happens periodically as a result of the filtration function. Instead, the removal process, which involves cutting the filter out of the annular recess in the fuel injector, effectively destroys the filter so that it cannot be reused. Finally, the installation of a new filter involves the same time consuming inconvenience as the initial installation of such a filter, i.e., the new filter must be secured in place and its free ends ultrasonically welded together.

Clearly, there is a need for a ring filter having a latching mechanism that allows it to be easily secured around the annular recess in a fuel injector body without the need for ultrasonic welding. The latching mechanism should further allow the filter to be easily and conveniently removed so that it may be cleaned and reused instead of discarded. Ideally, such a latch mechanism should not interfere with the contour of the inner diameter of the filter so that it may accurately seat itself in the annular recess of the fuel injector. Finally, the latch mechanism should be simple and inexpensive to manufacture, yet be capable of securing the ring filter in sealing engagement within the annular recess in the fuel injector.

SUMMARY OF THE INVENTION

Generally speaking, the invention is a filter ring having a snap latch mechanism that is conveniently attachable around a fluid conducting opening on the circumference of a fluid conducting body, such as the fuel inlet port of a fuel injector. The filter ring comprises first and second semi-annular, band-shaped filter portions for circumscribing the body over a fluid conducting port, a hinge for pivotally interconnecting one end of each of the filter portions, and a snap latch mechanism for detachably connecting the other end of the filter portions together so that the filter ring may be easily installed and removed. The latch mechanism includes a bead extending substantially along the entire edge of one of the remaining ends of a filter portion, and a groove in the remaining end of the other filter portion for resiliently receiving the bead. The co-extensiveness of the bead and groove with the width of the filter portion ends maximizes the gripping force of the snap latch mechanism when the bead is snapped into the groove.

To maintain an uninterrupted circular contour around the inner diameter of the filter ring, the thickness of the bead and groove of the latch mechanism is less than the thickness of the opposite ends of the band-shaped filter portions. Additionally, the ends of the band-shaped filter portions are formed from a resilient plastic material to implement the snap-action of the latch mechanism. Finally, the groove is preferably complementary in shape to the bead to further enhance the gripping force of the latch mechanism.

In the preferred embodiment, each of the band-shaped filter portions includes a semi-annular frame having a plurality of filter apertures along its circumference. A filtration material in the form of a filter screen is mounted across each of the filter apertures of the semi-annular frames.

To simplify manufacturing, the hinge of the filter ring may simply be an interconnecting piece of bendable plastic material that integrally interconnects the ends of the semi-annular filter portions that are opposite from the latch mechanism. The thickness of this plastic interconnection is less than the thickness of the frames of the filter portions to facilitate bending. The width of the frames of each of the filter portions is, of course, the same as the width of the annular recess of the fuel injector or other fluid conducting body that the filter ring is snapped around so that the filter ring will seat closely in the recess.

The snap latch mechanism of the filter ring of the invention, in combination with the integrally formed hinge, provides a filter ring that is simple in structure and easy and quick to install. Additionally, the snap latch mechanism allows the filter ring to be removed without damage, and then cleaned and reused a number of times.

BRIEF DESCRIPTION OF THE SEVERAL FIGURES

Figure 1:
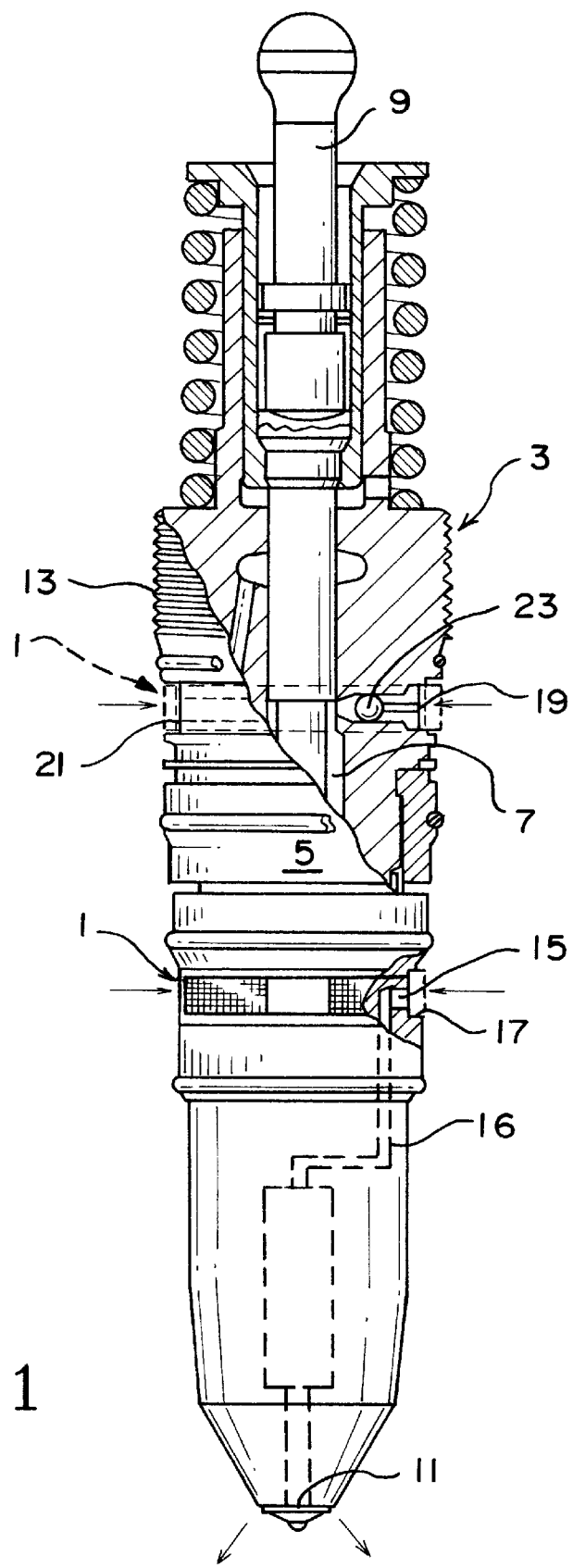
FIG. 1 is a partial, cross-sectional side view of a fuel injector with two of the band-type filters of the invention installed therearound.

Detailed Description Of The Preferred Embodiment:

With reference now to FIG. 1, the filter ring 1 of the invention is particularly adapted for use with a fuel injector 3 of the type used to meter fuel to the cylinders of diesel engines. Such fuel injectors 3 comprise a generally cylindrical injector body 5 having a fluid conducting interior 7 into which a spring loaded plunger 9 is slidably mounted. The upper end of the injector body 5 is circumscribed by mounting threads 13 for securing the injector into the block of a diesel engine, while the bottom end of the body 5 includes a fuel nozzle 11. A radially oriented fuel supply port 15 is provided in the mid-section of the injector body 5. This port 15 communicates with a fluid passageway 16 (shown in phantom) that ultimately conducts pressurized diesel fuel from the exterior of the injector body 5 through the fuel nozzle 11. An annular recess 17 which is complementary in shape to the inventive filter ring 1 circumscribes the injector body 5 at the axial location of the fuel supply port 15. When seated in the annular recess 17, the filter ring 1 filters pressurized diesel fuel that flows from the exterior of the injector body 5 through the fuel supply port 15 and on through the fuel passageway 16. A timing fluid port 19 is also provided in the injector body 5 above the fuel supply port 15. As was the case with the port 15, an annular recess 21 that is complementary in shape to the filter ring 1 of the invention circumscribes the injector body 5 at the axial location of the timing fluid port. A check valve 23 is placed in the timing fluid port 19 to prevent any back flow of timing fluids. In operation, a filter ring 1 of the invention (shown in phantom) is also seated in the annular recess 21 to filter timing fluids flowing from the exterior of the injector body 5 into its fluid conducting interior 7.

Figure 2:
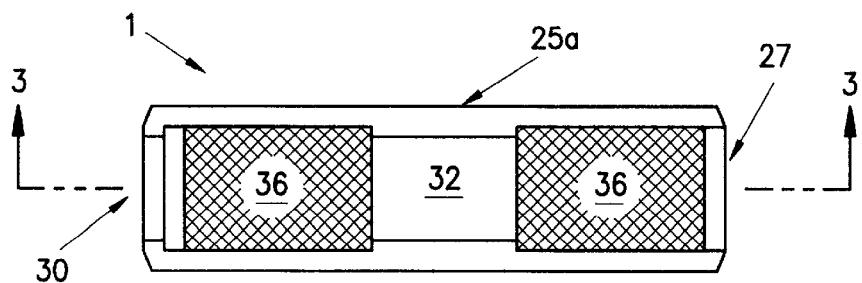
FIG. 2 is a side view of the band-type filter of the invention.
Figure 3:
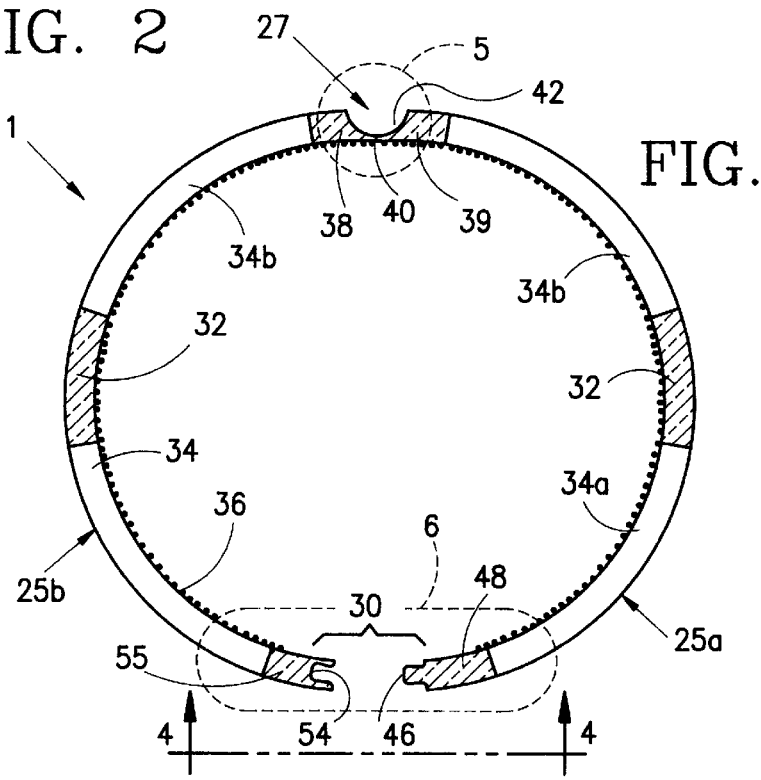
FIG. 3 is a cross-sectional plan view of the filter of FIG. 2 along the line 3—3.

With reference now to FIGS. 2 and 3, the filter ring 1 of the invention is formed from a pair of semi-annular filter portions 25a,b. An integrally-formed hinge 27 pivotally interconnects adjacent respective ends of the two semi-annular filter portions 25a,b. A snap latch mechanism 30 detachably interconnects the opposite ends of the filter portions 25a,b.

Each of the semi-annular filter portions 25a,b comprises a semi-annular frame 32 formed from a fuel resistant plastic material such as nylon 66 stiffened by a 13% content of glass particulates. This percent of glass particulates has been found to be optimum although a glass particulate content of between about 8% and 20% is operable. As the percent of glass particulates is reduced toward zero, operation of the hinge 27 improves but the plastic material exhibits insufficient rigidity to make the snap latch mechanism 30 work properly. On the other hand, if the percent of glass particulates is increased to approximately 30%, operation of the snap latch mechanism 30 is improved but the service life is shortened due to the resulting brittleness of the plastic material. Each semi-annular frame 32 includes a pair of rectangular filter apertures 34a,b. A circular strip 36 of filter mesh is adhered around the inner diameter of each of the semi-annular frames 32, such that each of the filter apertures 34 effectively frames a portion of the mesh strip 36. In the preferred embodiment, the strip 36 is a stainless steel 90 micron mesh.

Figure 5:
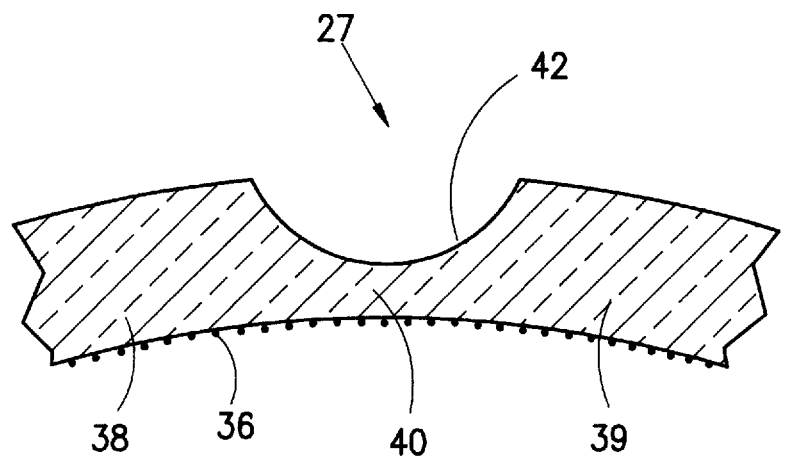
FIG. 5 is an enlargement of the circled area in FIG. 3, illustrating an enlarged plan view of the hinge of the band-type filter of the invention.

As is best seen in FIGS. 3 and 5, the hinge 27 interconnects opposing end portions 38,39 of frames 32 of opposing semi-annular filter portions 25a,b. The hinge 27 is preferably an integrally formed section 40 of the same plastic material that forms the frames 32 of the filter portions 25a,b, the only difference being that the section 40 is made thinner by means of longitudinal groove 42 in order to enhance its bendability. While the hinge 27 could assume any one of a number of different structures, the use of a thinned, integral section 40 of the same plastic material that forms the frames 32 of the filter portions 25a,b affords these filter portions with sufficient pivotal flexibility so as to allow the filter ring 1 to be easily installed or removed from a fuel injector 3 while maintaining a smooth inner diameter of the ring 1 that does not interfere with accurate seating. Additionally, because the integral structure of the hinge 27 does not violate the integrity of the walls of the frames 32, it does not disadvantageously admit unfiltered fuel or other liquids when seated in position in an annular recess.

Figure 4:
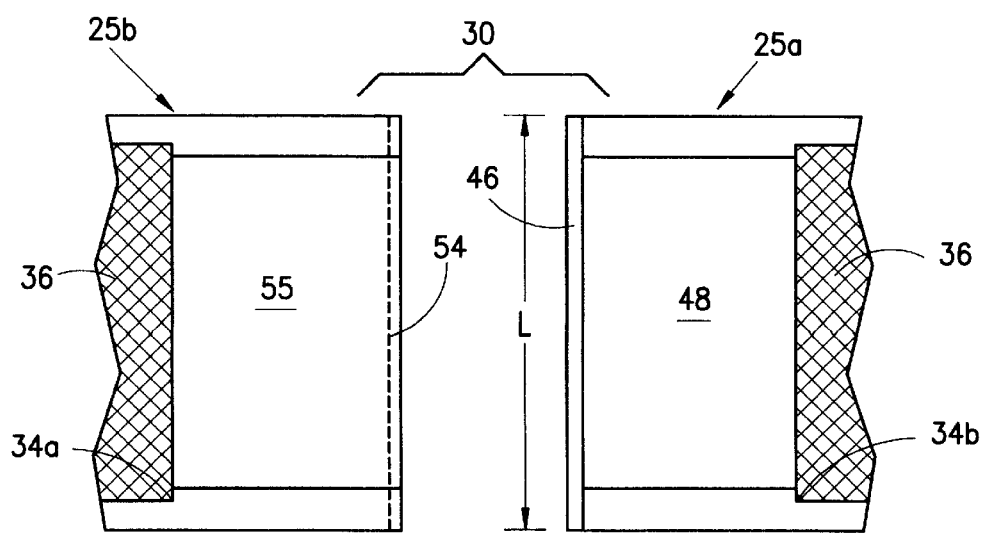
FIG. 4 is an enlarged side view of the band-type filter of FIG. 3 along the line 4—4, illustrating the snap latch mechanism.
Figure 6:
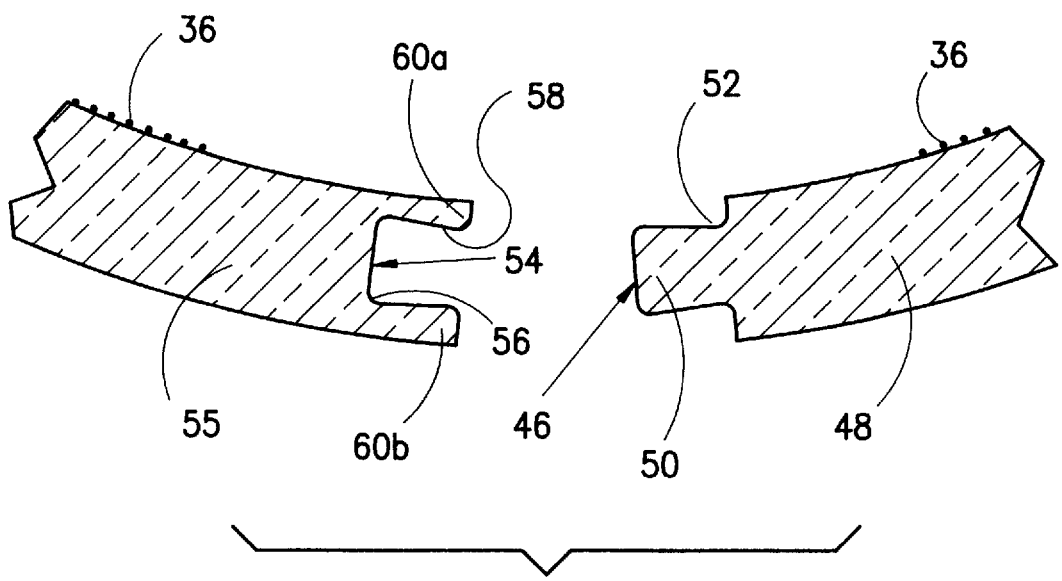
FIG. 6 is an enlargement of the circled area in FIG. 3, illustrating the details of the bead and groove of the snap latch mechanism.

With reference now to FIGS. 4 and 6, the snap latch mechanism 30 comprises a bead 46 that extends completely along the length L of the end portion 48 of the semi-annular filter portion 25a. As is best seen in FIG. 6, the bead 46 includes an enlarged distal portion 50 flanked by undercut proximal portions 52. The snap latch mechanism 30 further includes a groove 54 likewise disposed along the entire length of the end portion 55 of opposing filter portion 25b. The groove 54 is complementary in shape to the bead 46, having an enlarged proximal recess 56 flanked by tapered distal recesses 58. Because of the resilient nature of the plastic material forming the end portion 55, these tapered distal recesses 58 define resilient snap fingers 60a,b which fit into the undercut proximal portions 52 of the bead 46 when the bead 46 is inserted into the groove 54. The fact that both the bead 46 and the groove 54 traverse the entire length L of the end portions 48 and 55 further enhances the amount of gripping force that the latch mechanism 30 is able to apply between the opposing end portions 48 and 56. Furthermore, the fact that the thicknesses of the bead 46 and groove 54 are smaller than the overall thickness of the end portions 48 and 55 prevents the snap latch mechanism 30 from interfering with the circular contour of the inner diameter of the ring filter 1 when the two portions 25a,b are snapped together. Finally, the complementary shape of the bead 46 with the groove 54 and the tight fit therebetween that results from the resiliency of the snap fingers 60a,b prevents unfiltered fluid from radially flowing through the filter ring 1 when it is closed around an annular recess circumscribing a fuel injector or other fluid conducting body.

When the filter ring 1 is initially installed, the snap latch mechanism 30 is unsnapped to bring the filter ring 1 into the position shown in FIG. 3. The filter ring 1 is then slid over the body of a fuel injector 3 (or other fluid conducting body), and then snapped closed. In such a position, the filter ring 1 effectively filters a radial flow of pressurized fluid by directing this fluid through the filter apertures 34a,b on each of its two semi-annular filter portions 25a,b. When the filter apertures 34a,b become obstructed due to the accumulation of particulate foreign matter, the system operator can unsnap the ring 1 into the position illustrated in FIG. 3, and remove it from the fuel injector 3 or other fluid conducting body. The filter apertures 34a,b may be cleaned (for example, by compressed air), and the ring 1 may be reinstalled in the same manner that it was initially installed without destroying or impairing the structure of the ring 1.

While this invention has been described with respect to a single preferred embodiment, various additions, modifications, and alterations will become evident to persons of ordinary skill in the art. All such additions, modifications, and alterations are intended to be encompassed within the scope of this invention, which is limited only by the claims appended hereto.

What is claimed:

1. A filter ring for attachment around one or more circumferentially spaced openings in a fluid conducting body for filtering fluids flowing through said openings comprising:

first and second arcuate band-shaped filter portions for circumscribing said openings in said body;

hinge means for pivotally interconnecting a first end of each of said filter portions, and latch means for detachably connecting a second end of each of said filter portions together including a bead extending substantially along an entire length of said second end of said first filter portion, and a groove in said second end of said second filter portion for resiliently receiving said bead, wherein said bead and groove are completely disposed between inner and outer diameters of an annulus formed by said filter portions when said latch means connects said second ends of said first and second filter portions together in order to maintain an uninterrupted circular contour around said filter ring.

2. The filter ring of claim 1, wherein both said bead and said groove of said latch means extends an entire length of said second ends of their respective filter portions.

3. The filter ring of claim 1, wherein each of said band-shaped filter portions is semi-annular.

4. The filter ring of claim 1, wherein each of said band-shaped filter portions includes a frame means having filtration apertures, and filtration material adhered around an inner diameter of each of said frame means and covering each of the filtration apertures.

5. The filter ring of claim 4, wherein said filtration material is a filtration screen mounted over each of the filtration apertures.

6. The filter ring of claim 5, wherein said frame means of said band-shaped filter portions are formed from a resilient plastic material.

7. The filter ring of claim 6, wherein said hinge means is formed from an integral connection of said resilient plastic material between the first end of the frame means of both of said first and second filter portions.

8. The filter ring of claim 7, wherein the integral connection has a thickness that is less than a thickness of the frame means of each of said filter portions to facilitate bending.

9. The filter ring of claim 1, wherein said first and second band-shaped filter portions form an annulus that is complementary in shape to a recess in said fluid conducting body when said filter ring is attached around said body by said latch means.

10. A filter ring attachable around and detachable from an annular recess in a fuel injector that includes one or more fuel inlet openings around its circumference, comprising:

a first and second band-shaped semi-annular filter portions receivable within said annular recess of said fuel injector;

hinge means for pivotally interconnecting a first end of each of said filter portions, and latch means for detachably connecting said filter portions around said annular recess of said fuel injector, including a bead extending along an entire length of a second end of said first filter portion, and a groove in a second end of the second filter portion that likewise extends an entire length of said second end for resiliently receiving said bead, wherein said bead and groove are completely disposed between inner and outer diameters of an annulus formed by said filter portions when said latch means connects said second ends of said filter portions in order to maintain an uninterrupted circular contour around the inner and outer diameters of the resulting filter ring.

11. The filter ring of claim 10, wherein said groove is complementary in shape to said bead.

12. The filter ring of claim 10, wherein said band-shaped filter portions include semi-annular frame means formed from a resilient plastic material, and said hinge means is formed from an integral connection of said resilient plastic material between first ends of said frame means of said first and second filter portions.

13. The filter ring of claim 12, wherein each frame means includes filtration apertures, and each of said filtration apertures of said frame means includes a filtration screen.

14. The filter ring of claim 12, wherein the plastic material forming the hinge means has a thickness that is less than a thickness of the plastic material forming the frame means of each of the filter portions to facilitate bending.

* * * * *